Oct. 25, 1938.  T. A. OLSON  2,134,372
GAUGE
Filed June 3, 1936  2 Sheets-Sheet 1

INVENTOR
THEODORE A. OLSON.
BY Gales P. Moore
HIS ATTORNEY.

Oct. 25, 1938. T. A. OLSON 2,134,372
GAUGE
Filed June 3, 1936 2 Sheets-Sheet 2

INVENTOR
THEODORE A. OLSON
BY Gales P. Moore
HIS ATTORNEY

Patented Oct. 25, 1938

2,134,372

UNITED STATES PATENT OFFICE 2,134,372

GAUGE

Theodore A. Olson, Pompton Plains, N. J., assignor to General Motors Corporation, Detroit, Mich., a corporation of Delaware Application June 3, 1936, Serial No. 83,180

11 Claims. (Cl. 33—180)

This invention relates to gauges and comprises all of the features of novelty herein disclosed. An object of the invention is to provide a gauge for testing the form and/or location of a series of openings in a ring. Another object is to provide a machine for accurately indicating when a bearing separator or cage has its rolling element receiving openings properly formed for efficient co-operation with rolling elements. Another object is to provide a gauging machine for determining or comparing the spacing or contour of openings in a bearing separator or the like with those of a master article.

To these ends and also to improve generally upon devices of this character, the invention consists in the various matters hereinafter described and claimed. In its broader aspects, the invention is not necessarily limited to the specific construction selected for illustrative purposes in the accompanying drawings in which—

Figures 1, 2:
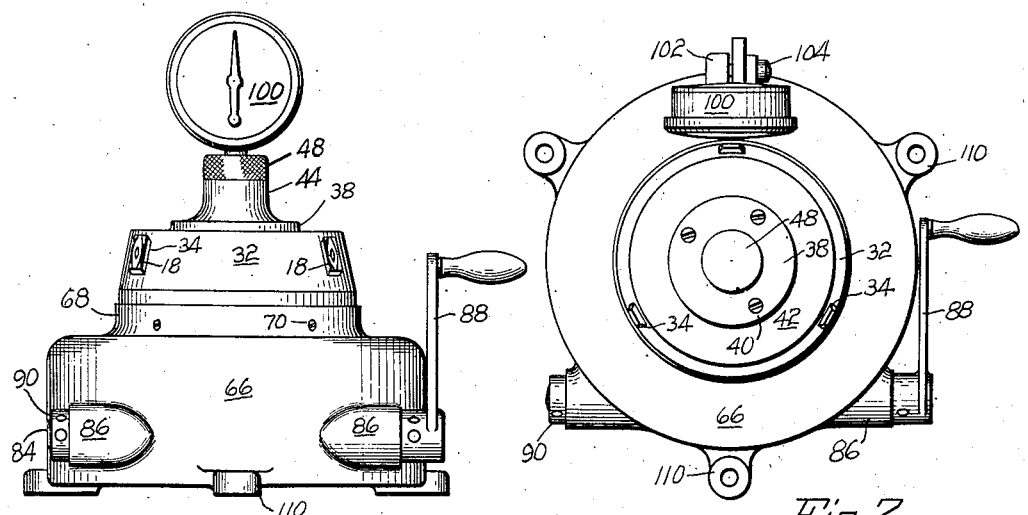
Fig. 1 is a front elevation of the machine.
Fig. 2 is a plan view.
Figure 3:
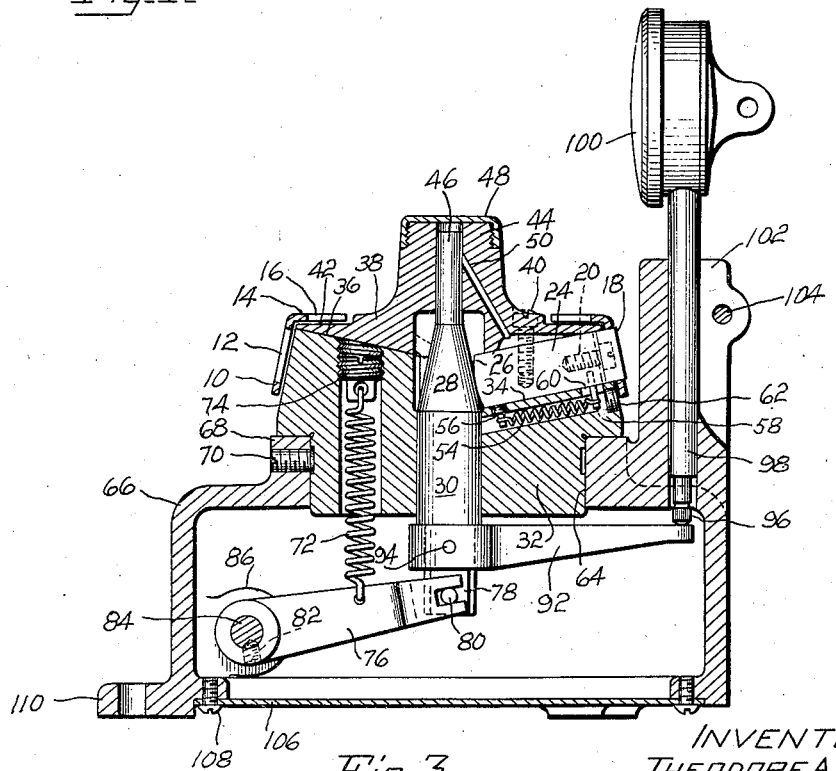
Fig. 3 is an enlarged sectional view taken centrally in a vertical plane.
Figure 4:
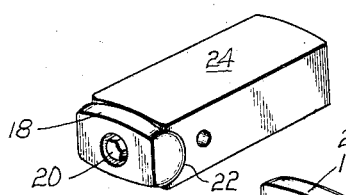
Fig. 4 is a perspective view of one of the slides with its gauge segment connected thereto.
Figure 5:
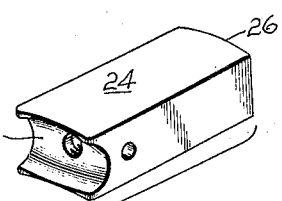
Fig. 5 is a perspective view of one of the slides with its gauge segment separated therefrom.
Figure 6:
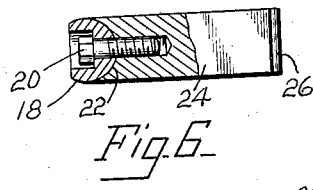
Fig. 6 is a side elevation, partly in section, of the elements shown in Fig. 4.
Figure 7:
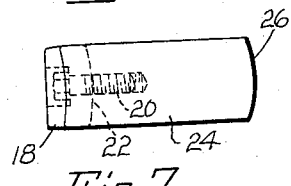
Fig. 7 is a side elevation of the elements shown in Fig. 4.
Figure 8:
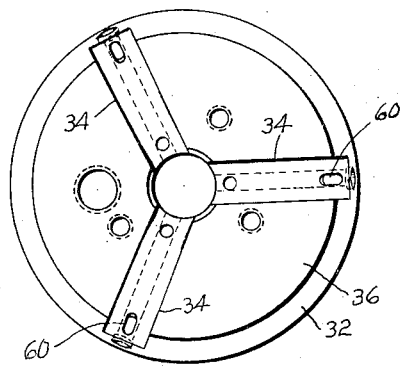
Fig. 8 is a plan view of a guide block.
Figure 9:
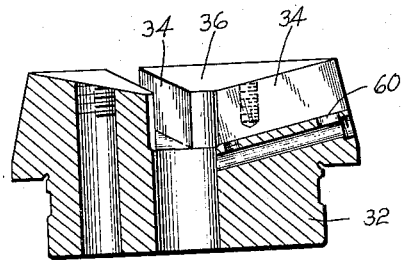
Fig. 9 is a vertical sectional view of the guide block.

This machine is used to test the form and location of the roller openings in a bearing cage, separator, or similar ring. The illustrated cage comprises a body portion 10 which is conical and provided with openings 12 for the rollers, these openings conforming to the transverse curvature of the rollers but not being large enough to allow the rollers to pass through the openings from the inside. The cage also has an end flange 14 and a plurality of fingers 16 which are subsequently bent inwardly substantially parallel to the body portion to hold the rollers in their openings. The present cage is adapted for barrel shaped rollers R which have flat ends and a surface which is curved on an arc.

The form and location of the openings 12 are tested by shoving into a plurality of them gauge members in the form of roller segments 18 which are adapted to engage the edges of the openings in the same manner as the bearing rollers. That is, the segments will partially enter the openings but, like the bearing rollers, are too large to pass entirely through the openings. Each segment is secured by a headed screw 20 countersunk therein and threaded into a slide 24 which has a concave socket 22 into which a portion of the roller segment fits. Each slide has its inner end curved as indicated at 26 to engage a conical cam 28 formed on a shaft 30 which is slidable vertically in a hole of a block 32.

Each slide is guided radially in a slot 34 in the block, the slides being radially arranged except that they slant outwardly and upwardly to lie normal to the cage body. One of the slides fits closely in its slot the walls of which are parallel but, as to the other two slides, the side walls 34 diverge a very little as they proceed outwardly. This will give two of the gauge segments 18 a very slight movement circumferentially of the cage to better find their openings.

The top of the block 32 has a conical surface 36 on which rests a similar surface of a cover 38 which is fastened to the block by screws 40. The cover has an annular ledge 42 to support the cage flange 14 and to accommodate the fingers 16. The cover also has an upward extension 44 having a hole providing a bearing for an extension 46 of the shaft 30, this hole being closed by a dust cap 48 threaded on the extension. Extending downwardly and outwardly from the shaft extension 46 are three oil ports 50 for conducting oil to the slides. The side walls of the block 32 are conical to conform with the body of the cage. The cage rests somewhat loosely on the cover 38 and on the block so that when the slides are urged outwardly, the contoured sides of the roller segments 18 engage the rims of the openings and support the cage.

Before the cage is applied, the slides are urged inwardly by coiled tension springs 54 each anchored to a screw 56 on the block 32 and to a pin 58 projecting downwardly from the slide through a slot 60. The spring is contained in a hole of the block 32 and this hole is closed at its outer end by a screw plug 62.

The block has a portion centered in an opening 64 of a hollow base 66 having an upwardly projecting rim 68 which is tapped at intervals to receive clamping screws 70 projecting into an annular groove of the block. To furnish a uniform pressure tending to raise the cam 28 and so thrust all of the slides outwardly, a coil spring 72 is anchored by a screw plug 74 in the block 32 and connected at its lower end to a crank arm 76 having its end forked to straddle flat sides 78 at the lower end of the shaft 30, each arm of the fork also being forked to straddle a pin 80 which is passed through the shaft.

The crank arm 76 is secured by set screws 82 to a shaft 84 which is rockably mounted in bearing lugs 86 on the base, a crank handle 88 being pinned to the shaft outside of the base for manual operation when the cam is depressed to apply the cage to operative position. The shaft 84 is held from endwise movement by the hub of the crank handle and by a collar 90 pinned to the opposite end of the shaft.

In order to obtain an indication of the amount of upward movement of the shaft 30 which indication gives an average of the extent of projection of the three gauge segments into the cage openings, an arm 92 is secured to the shaft by a pin 94 and bears at its end against the lower end of a gauge stem 96. The stem is slidable in a hollow post 98 carrying an indicator 100, the post being held in a hollow boss 102 on the frame, the boss being split and clamped around the post by a clamp screw 104.

Dust is excluded from the interior of the hollow base by a dust plate 106 fastened by screws 108. The base is adapted to be fastened to any suitable bench or table and for this purpose has a number of outwardly extending feet or lugs 110 which are apertured for fastening devices.

Figure 11:
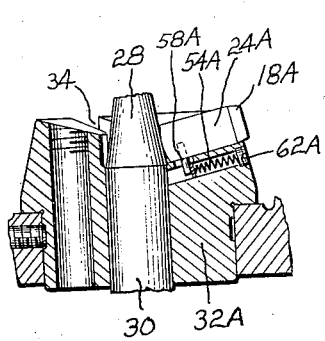
Fig. 11 is a vertical sectional view of a guide block and slide of modified form.
Figure 10:
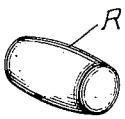
Fig. 10 is a perspective view of a bearing roller.

In a modification illustrated in Figure 11 and adapted for smaller cages, gauge segments 18A to fit the corresponding roller openings are secured to radial slides 24A which are urged inwardly by compression springs 54A abutting against a washer backed up by a pin 58A projecting from the slide, the outer ends of the springs abutting against a screw plug 62A threaded in the block 32A.

In operation, the handle 88 is turned to lower the cam 28, the small coil springs 54 thereby urging the slides 24 radially inwards. A separator, cage or similar ring is then laid on the support provided by the block and its cover. The handle is then released, the large coil spring 72 thereupon lifting the cam 28 which forces the slides outwardly. The gauge members or segments 18 which, like the bearing rollers, are too large to pass through the openings, engage the rims of the openings 12 with a definite pressure which is independent of the human element, this pressure being equalized because the article floats or becomes supported by the three gauge members clear of the support. The extent of upward movement of the cam is shown by the indicator 100 and this movement provides an indication of the average extent of entry of the gauge members into the openings. This reading is compared with that previously obtained by measurements on a master article having its openings properly spaced and contoured. Articles which are not of the right diameter or do not have the openings properly shaped within prescribed limits are rejected. In the case of bearing separators or cages, some uneven spacing of the openings is permissible and the diverging guide slots 34 will permit two of the gauge members to have a slight circumferential movement to align with their openings.

I claim:

1. In a device of the character described, a circular block having radial guide slots and a central opening, a cover for the block and having a seat to support a separator flange, a shaft guided axially in the opening and having a cam, slides engaging the cam and having gauge members to enter openings in the separator, means for shifting the shaft, and means to indicate the extent of shifting; substantially as described.

2. In a device for testing the form and location of roller openings in a bearing separator or the like, a support for the separator, a plurality of gauge members guided in the support to move substantially radially of the separator and its support, the gauge members being constructed and positioned to engage the rims of the separator openings and being larger than the separator openings, a cam shiftable axially in the support to spread the gauge members radially of the separator and its support, means for actuating the cam to cause the gauge members to make contact with the rims of the separator openings, and means for indicating the extent of outward movement of the gauge members; substantially as described.

3. In a device for testing the form and location of roller openings in a bearing separator or the like, an internal support for the separator, slides shiftable radially outward of the support and the separator, gauge members on the slides and constructed and positioned to engage the rims of the roller openings, springs for urging the slides towards the center of the support and the separator, a cam shiftable through said center and engaging said slides to move them radially, a spring for actuating the cam to force the gauge members into contact with the rims of the openings whereby to transfer the weight of the separator from the support to the gauge members, and means for indicating the extent of movement of the cam; substantially as described.

4. In a device for testing the form and location of roller openings in a bearing separator or the like, a circular support smaller than the separator, the support having a central opening and guideways extending substantially radially therefrom, slides movable radially outward in said guideways and having gauge members contoured to fit the rims of the separator openings, a cam shiftable axially of the central opening for engaging and spreading the slides radially outward and thereby causing the gauge members to disengage the separator from the support by engaging the rims of the separator openings, and means for indicating the condition of the openings; substantially as described.

5. In a device for testing the form and location of roller openings in a bearing separator or the like, a circular support for initially positioning the separator, a plurality of gauge members contoured to fit the rims of the separator openings, means for guiding one of the gauge members radially of the support, the support having substantially radial guiding means for the other gauge members, said guiding means being constructed and arranged to provide for limited movement of its gauge members circumferentially of the support, means for spreading the gauge members to cause them to engage the rims of the separator openings, and means for indicating the extent of such spreading; substantially as described.

6. In a device for testing the form and location of roller openings in a bearing separator or the like, a support for the separator, the support having substantially radial guide slots, slides mounted in the guide slots and having gauge members to engage the rims of the separator openings, one of the guide slots having parallel sides for one of the slides, the other guide slots having diverging side walls for the remaining slides, means for shifting the slides in the guide slots, and means for indicating the extent of shifting; substantially as described.

7. In a device for testing the form and location of roller openings in a bearing separator or the like, a support for the separator, a plurality of gauge members, each gauge member having a size and contour the same as the bearing rollers, means for yieldingly urging the gauge members substantially radially of the separator to cause the gauge members to engage the rims of the separator openings, and means providing an indication of the extent of movement of the gauge members; substantially as described.

8. In a device for testing the form and location of roller openings in a bearing separator or the like, a circular support for the separator, the support being of smaller diameter than the separator to approximately center the separator with provision for limited shifting thereof, gauge members having the size and contour of the bearing rollers, means for urging the gauge members radially outward with respect to the separator and its support to cause the gauge members to engage the rims of the separator openings and to thereby transfer the weight of the separator from the support to the gauge members, and means for indicating the average extent of movement of the gauge members; substantially as described.

9. In a device for testing the form and location of roller openings in a bearing separator or the like, a block adapted to fit loosely within the separator and having a separator supporting ledge, guide slots extending radially of the block, slides movable radially outward in the guide slots and having gauge members contoured to fit the rims of the separator openings, spring actuated means for urging the slides radially outwardly in the guide slots to thereby cause the gauge members to support the separator by contact of the gauge members with the rims of the separator openings, and means for indicating the condition of the openings; substantially as described.

10. In a device for testing the form and location of roller openings in a bearing separator or the like, a block having a tapered external surface and an axial opening, the block having guide slots extending substantially radially of the opening, a cover for the slots and having an annular supporting ledge for a flange on the separator, the external surface of the block conforming approximately to the interior of the separator body, slides in the guide slots and having gauge members to engage the rims of the separator openings, a shaft in said axial opening and having a cam to engage the slides, means for axially moving the shaft, and means for indicating the extent of movement of the shaft; substantially as described.

11. In a device for testing the form and location of roller openings in a bearing separator or the like, a circular support having an upwardly presented supporting ledge, a plurality of slides guided substantially radially of the support, gauge members on the outer ends of the slides and contoured to fit the rims of the separator openings, the block having an axial opening, an upright shaft slidable in the opening, a cam on the shaft and engaging the slides to spread them outwardly, means for shifting the shaft to cause the gauge members to engage the rims of the separator openings, and means for indicating the extent of movement of the gauge members; substantially as described.

THEODORE A. OLSON.